(12) United States Patent
Shen et al.

(10) Patent No.: US 12,436,854 B2
(45) Date of Patent: Oct. 7, 2025

(54) MEMORY DEVICE AND CONTROL METHOD FOR PERFORMING ROW HAMMER PROTECTION

(71) Applicant: NANYA TECHNOLOGY CORPORATION, New Taipei (TW)

(72) Inventors: William Wu Shen, Taipei (TW); Chung Hsun Lee, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/470,431

(22) Filed: Sep. 20, 2023

(65) Prior Publication Data

US 2025/0094298 A1    Mar. 20, 2025

(51) Int. Cl.
*G06F 11/22* (2006.01)

(52) U.S. Cl.
CPC .... *G06F 11/2231* (2013.01); *G06F 2201/805* (2013.01)

(58) Field of Classification Search
CPC ............ G06F 11/2231; G06F 2201/805
See application file for complete search history.

(56) References Cited

U.S. PATENT DOCUMENTS

| | | | |
|---|---|---|---|
| 9,032,141 B2 | 5/2015 | Bains et al. | |
| 9,721,643 B2 | 8/2017 | Bains et al. | |
| 9,799,390 B2 | 10/2017 | Song | |
| 10,102,886 B2 | 10/2018 | Crawford et al. | |
| 10,825,534 B2 | 11/2020 | Nale | |
| 11,257,535 B2 | 2/2022 | Shore et al. | |
| 2003/0115405 A1* | 6/2003 | Funyu | G11C 11/40618 711/167 |
| 2012/0218843 A1* | 8/2012 | Yun | G11C 29/783 365/194 |
| 2014/0085995 A1 | 3/2014 | Greenfield et al. | |
| 2015/0243338 A1* | 8/2015 | Sohn | G11C 11/4087 365/189.05 |
| 2017/0365324 A1 | 12/2017 | Bains et al. | |
| 2019/0066759 A1 | 2/2019 | Nale | |

(Continued)

FOREIGN PATENT DOCUMENTS

TW    202127444    7/2021

OTHER PUBLICATIONS

William Wu Shen et al., "Memory Device and Control Method for Controlling Memory Device", Unpublished U.S. Appl. No. 18/350,753, filed Jul. 12, 2023.

(Continued)

*Primary Examiner* — Thien Nguyen
(74) *Attorney, Agent, or Firm* — JCIPRNET

(57) ABSTRACT

A memory device and a control method of the memory device are provided. The control method includes: providing access count values to memory rows of the memory device respectively when the memory row are accessed; performing a refresh operation on the memory rows sequentially and resetting the access count values sequentially in response to a refresh command; receiving an interrupt command to interrupt the refresh operation, wherein the refresh operation is interrupted when performing on an interrupt memory row; completing the refresh operation on the interrupt memory row; and recharging at least one adjacent memory row next to the interrupt memory row.

11 Claims, 6 Drawing Sheets

(56) References Cited

U.S. PATENT DOCUMENTS

| | | |
|---|---|---|
| 2022/0129200 A1 | 4/2022 | Van Der Veen et al. |
| 2022/0165328 A1 | 5/2022 | Ishikawa et al. |
| 2022/0262428 A1 | 8/2022 | Bains et al. |
| 2022/0415384 A1* | 12/2022 | SeyedzadehDelcheh ................... G11C 11/40603 |
| 2023/0042731 A1 | 2/2023 | Sasaki |
| 2023/0418487 A1* | 12/2023 | Kim ..................... G06F 3/0679 |

OTHER PUBLICATIONS

"Notice of allowance of Taiwan Counterpart Application", issued on Nov. 29, 2024, p. 1-p. 3.

\* cited by examiner

MEMORY DEVICE AND CONTROL METHOD FOR PERFORMING ROW HAMMER PROTECTION

BACKGROUND

Technical Field

The disclosure generally relates to a memory device and a control method for controlling the memory device, and more particularly to a memory device and a control method for performing row hammer protection.

Description of Related Art

Generally, a memory device performs a mitigation operation on memory rows in a memory array to prevent rowhammer event. When an access count value on a memory row reaches a threshold value. The memory device performs the mitigation operation to refresh the memory rows nearby the memory row. The memory device performs a refresh operation on the memory rows. During the refresh operation, the memory device recharges the memory row sequentially and resets access count values sequentially.

However, when receiving an interrupt command during the refresh operation, the memory device interrupts the refresh operation. The mitigation operation may not protect some memory rows, that cause some of the memory rows under risk. For example, please refer to FIG. 1, FIG. 1 illustrates memory rows MR(1) to MR(m). When receiving an interrupt command during the refresh operation, the refresh operation is interrupted. Each of data stored in the memory rows MR(1) to MR(n) is recharged (refreshed). Access count values of the memory rows MR(1) to MR(n) are reset to "0". When the memory rows MR(n) is frequently accessed, the memory rows MR(n+1) and MR(n+2) probably could be damaged by a row hammer before the access count value of the memory rows MR(n) reaching to the threshold value.

Therefore, how to prevent the row-hammer after receiving an interrupt command during the sequential refresh operation which resets the access count values of the memory rows is one of the research and development focuses of those skilled in the art.

SUMMARY

The disclosure provides a memory device and a control method of the memory device for preventing a row-hammer after receiving an interrupt command during the sequential refresh operation which resets the access count values of the memory rows.

The control method is used for performing row hammer protection of the memory device. The memory device comprises memory rows. The control method includes: providing access count values to the memory rows respectively when the memory rows are accessed; performing a refresh operation on the memory rows sequentially and resetting the access count values sequentially in response to a refresh command; receiving an interrupt command to interrupt the refresh operation, wherein the refresh operation is interrupted when performing on an interrupt memory row; completing the refresh operation on the interrupt memory row; and recharging at least one adjacent memory row next to the interrupt memory row.

The memory device includes a memory array and a control circuit. The memory array includes memory rows. The control circuit is coupled to the memory array. The control circuit provides an access count values to the memory rows respectively when the memory rows are accessed. The control circuit performs a refresh operation on the memory rows sequentially and resets the access count values sequentially in response to a refresh command. The control circuit receives an interrupt command to interrupt the refresh operation. The refresh operation is interrupted when performing on an interrupt memory row. The control circuit completes the refresh operation on the interrupt memory row, and recharges at least one adjacent memory row next to the interrupt memory row.

Based on the above, when the refresh operation is interrupted, the interrupt memory row is determined. The at least one adjacent memory row next to the interrupt memory row is recharged. Therefore, when the interrupt memory row is frequently accessed, the at least one adjacent memory row next to the interrupt memory row could not be damaged by the row hammer.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise"

and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
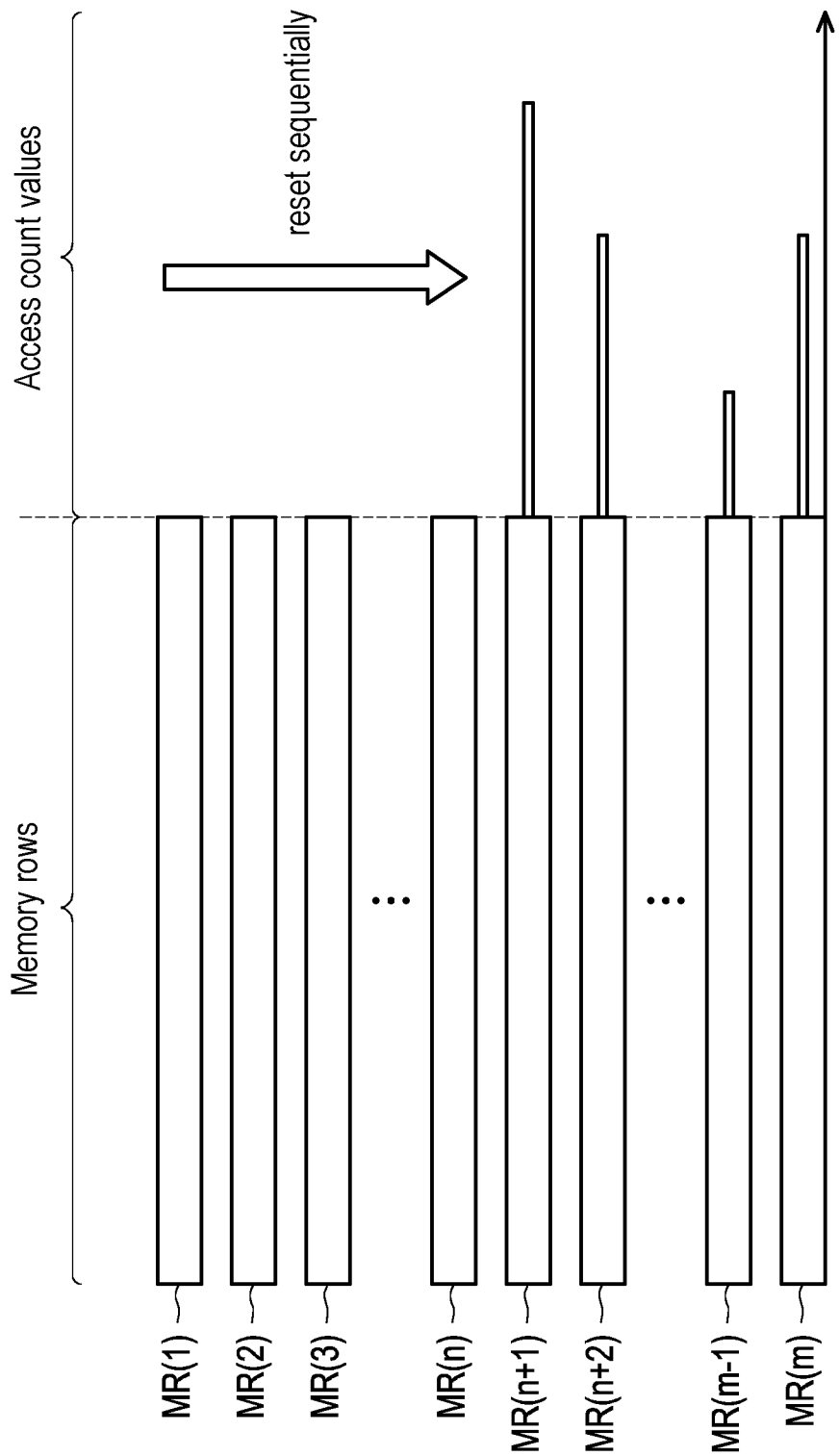
FIG. 1 illustrates a schematic diagram of memory rows.
Figure 2:
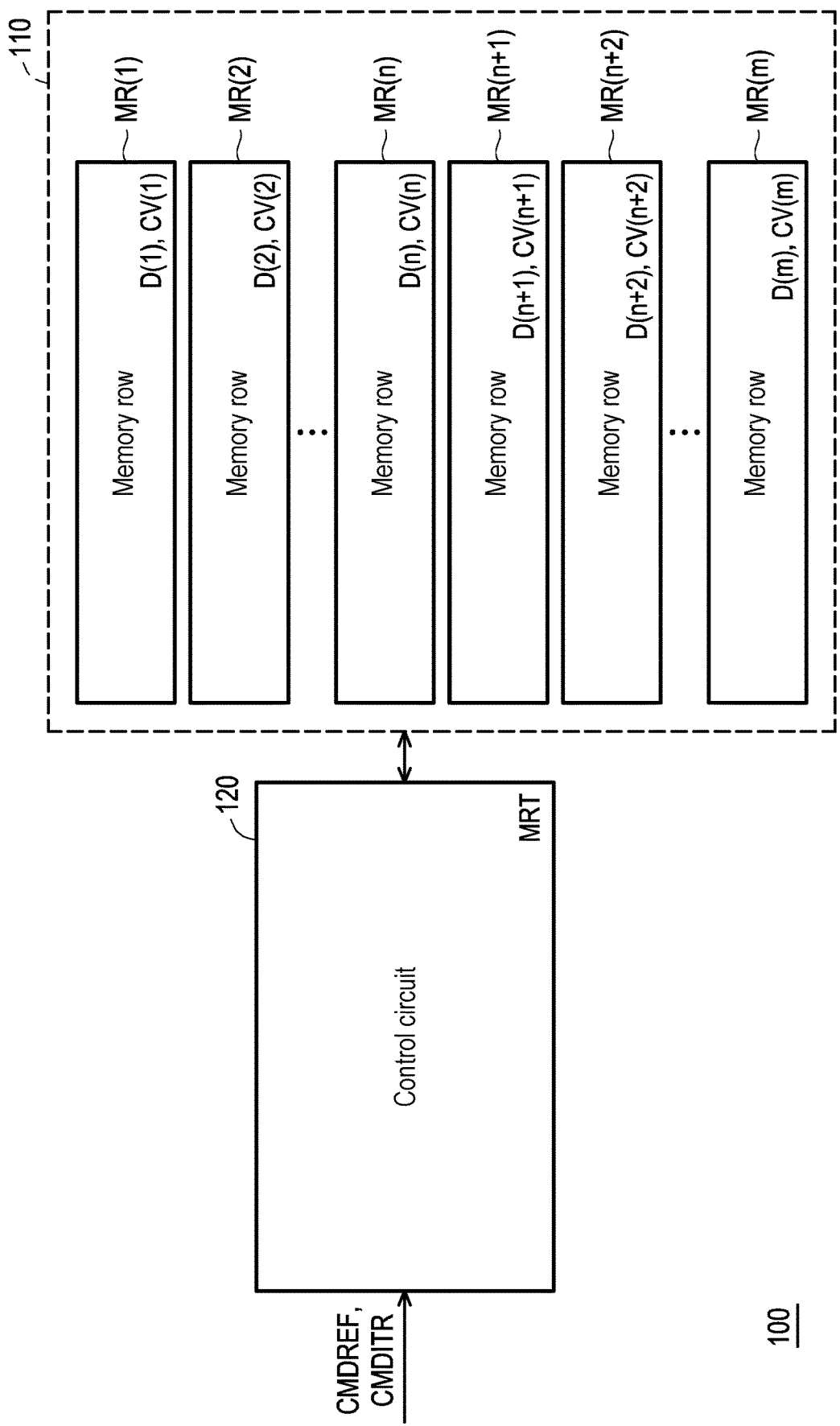
FIG. 2 illustrates a schematic diagram of a memory device according to an embodiment of the disclosure.

FIG. 2 illustrates a schematic diagram of a memory device according to an embodiment of the disclosure. Please refer to FIG. 2, in the embodiment, the memory device 100 may be an any type of DRAM device, but the disclosure is not limited thereto. the memory device 100 includes a memory array 110 and a control circuit 120. The memory array 110 includes memory rows MR(1) to MR m). The control circuit 120 is coupled to the memory array 110. The control circuit 120 provides access count values CV(1) to CV(m) to the memory rows MR(1) to MR (m) respectively when the memory rows MR(1) to MR (m) are accessed.

In the embodiment, when the memory rows MR(1) is accessed, the control circuit 120 may read the access count value CV(1), increment the access count value CV(1) and then provide the access count value CV(1). When the memory rows MR(2) is accessed, the control circuit 120 may read the access count value CV(2), increment the access count value CV(2) and then provide the access count value CV(2), and so on. When at least one of the access count values CV(1) to CV(m) reaches to a threshold value, the control circuit 120 performs a mitigation operation on at least one memory row having a row-hammer event risk.

In the embodiment, the control circuit 120 performs a refresh operation on the memory rows MR(1) to MR(m) sequentially and resets the access count values CV(1) to CV(m) sequentially in response to a refresh command CMDREF.

In the embodiment, when receiving refresh command CMDREF, the control circuit 120 performs the refresh operation. During the refresh operation, the control circuit 120 refreshes data D(1) to D (m) stored in the memory rows MR(1) to MR(m) sequentially and resets the access count values CV(1) to CV(m) sequentially based on a row refresh order. For example, during the refresh operation, in a first period, the control circuit 120 refreshes the data D(1) stored in the memory row MR(1) and resets the access count value CV(1). In a second period after the first period, the control circuit 120 refreshes the data D(2) stored in the memory row MR(2) and resets the access count value CV(2). In a "n"th period, the control circuit 120 refreshes the data D(n) stored in the memory row MR(n) and resets the access count value CV(n). In a "m"th period, the control circuit 120 refreshes the data D(m) stored in the memory row MR(m) and resets the access count value CV(m).

In the embodiment, the control circuit 120 interrupts the refresh operation when receiving an interrupt command CMDITR. The refresh operation is interrupted when performing on an interrupt memory row MRT. The control circuit 120 completes the refresh operation on the interrupt memory row MRT, and recharges at least one adjacent memory row next to the interrupt memory row MRT.

Based on the row refresh order and a time point of receiving the interrupt command CMDITR, the control circuit 120 can obtain the interrupt memory row MRT.

For example, the refresh operation is interrupted when performing on the memory row MR(n). Therefore, the control circuit 120 determines that the memory row MR(n) is the interrupt memory row MRT. After the interrupt is lifted (or released), the control circuit 120 completes the refresh operation on the memory row MR(n) and recharges at least one adjacent memory row next to the memory row MR(n).

For example, the control circuit 120 recharges the memory row MR(n+1) next to the memory row MR(n). Particularly, the control circuit 120 may recharge the data D(n+1) and the access count value CV (n+1) of the memory row MR(n+1) next to the memory row MR(n). In some embodiments, the control circuit 120 may recharge the data D(n+1) by rewriting the same data D(n+1), and recharge the access count value CV(n+1) of the memory row MR(n+1) by rewriting the same access count value CV(n+1).

For example, the control circuit 120 recharges the memory row MR(n+1) and the memory row MR(n+2) next to the memory row MR(n). Particularly, the control circuit 120 may recharge the data D(n+1) and the access count value CV(n+1) of the memory row MR(n+1), and recharge the data D(n+2) and the access count value CV(n+2) of the memory row MR(n+2).

It should be noted, when the refresh operation is interrupted in response to the interrupt command CMDITR, the control circuit 120 determine the interrupt memory row MRT. The control circuit 120 recharges at least one adjacent memory row next to the interrupt memory row MRT. Therefore, when the interrupt memory row MRT is frequently accessed, the at least one adjacent memory row next to the interrupt memory row MRT could not be damaged by the row hammer.

Figure 3:
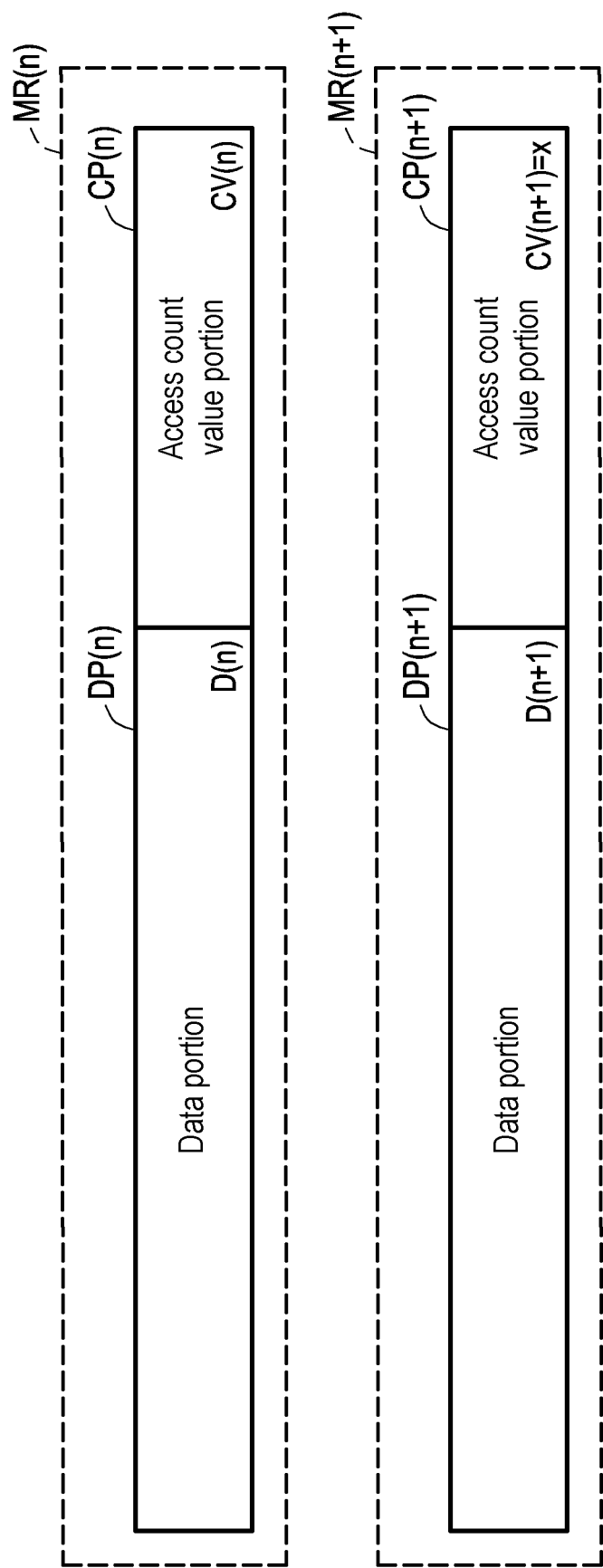
FIG. 3 illustrates a schematic diagram of memory rows MR(n) and MR(n+1) after an interrupt is lifted according to an embodiment of the disclosure.

FIG. 3 illustrates a schematic diagram of memory rows MR(n) and MR(n+1) after an interrupt is lifted according to an embodiment of the disclosure. Please refer to FIG. 2 and FIG. 3, each of the memory row MR(1) to MR(m) includes a data portion for storing the data and an access count value portion storing the access count value. The memory rows MR(n) includes the data portion DP(n) and the access count value portion CP(n). The data portion DP(n) is used to store the data D(n). The access count value portion CPI(n) is used to store the access count value CV(n). The memory rows MR(n+1) includes the data portion DP (n+1) and the access count value portion CP(n+1). The data portion DP (n+1) is used to store the data D(n+1). The access count value portion CP(n+1) is used to store the access count value CV(n+1).

In the embodiment, when performing the refresh operation, the control circuit 120 recharges the data in the data portions of the memory rows MR(1) to MR(m) sequentially, and resets the access count values CV(1) to CV(m) in the access count value portions of the memory rows MR(1) to MR(m) to an initial value sequentially. The initial value may be "0", but the disclosure is not limited thereto.

The control circuit 120 receives the interrupt command CMDITR when the refresh operation performing on the memory row MR(n). The refresh operation is interrupted. Thus, after the interrupt is lifted, the control circuit 120 recharges the same data D(n) in the data portion DP(n). Besides, the control circuit 120 resets the access count value CV(n) to the initial value and write the access count value CV(n) having the initial value into the access count value portion CP(n).

Then the control circuit 120 recharges the same data D (n+1) in the data portion DP(n+1). In other words, the data D(n+1) is refreshed. Besides, the control circuit 120 recharges the access count value CV(n+1) in the access count value portion CP(n+1). For example, the access count value CV(n+1) is "x", the control circuit 120 recharges the access count value CV(n+1) as "x" again.

It should be noted, after the interrupt is lifted, the control circuit 120 resets the access count value CV(n) and recharges the memory row MR(n+1). Therefore, when the memory row MR(n) is frequently accessed, the recharged the data D(n+1) stored in the data portion DP(n+1) could not be damaged by the row hammer. The mitigation operation may be any type of local refresh operation on at least the memory row MR (n+1). For example, the mitigation operation is descripted in U.S. application Ser. No. 18/350,753, but the disclosure is not limited thereto.

Figure 4:
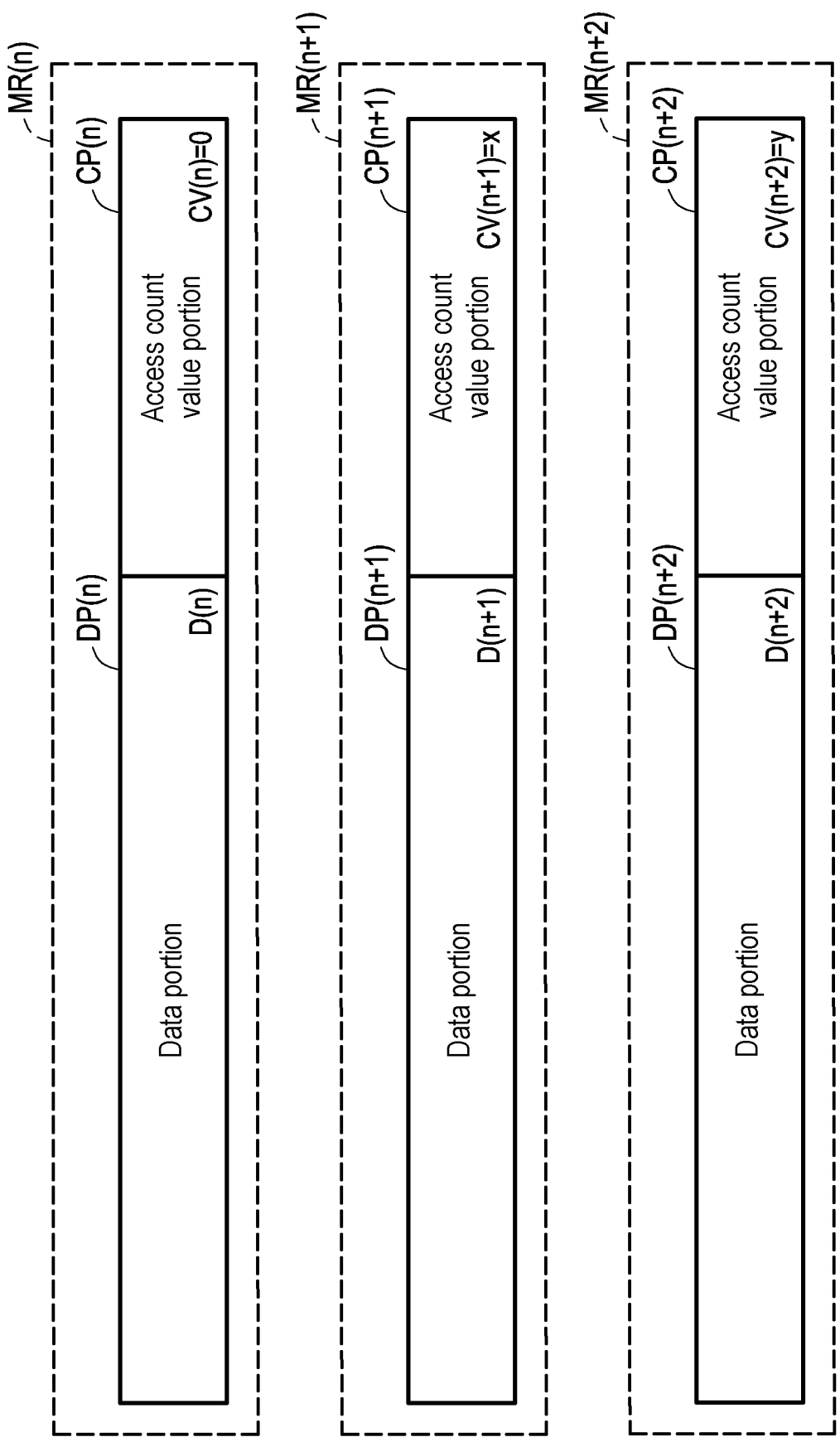
FIG. 4 illustrates a schematic diagram of memory rows MR(n) to MR(n+2) after an interrupt is lifted according to an embodiment of the disclosure.

FIG. 4 illustrates a schematic diagram of memory rows MR(n) to MR(n+2) after an interrupt is lifted according to an embodiment of the disclosure. Please refer to FIG. 2 and FIG. 4, in the embodiment, FIG. 4 illustrates the memory rows MR(n) to MR(n+2). The memory rows MR(n) includes the data portion DP(n) and the access count value portion CP(n). The data portion DP(n) is used to store the data D(n). The access count value portion CP(n) is used to store the access count value CV(n). The memory rows MR(n+1) includes the data portion DP(n+1) and the access count value portion CP(n+1). The data portion DP(n+1) is used to store the data D(n+1). The access count value portion CP(n+1) is used to store the access count value CV n+1). The memory rows MR(n+2) includes the data portion DP(n+2) and the access count value portion CP(n+2). The data portion DP(n+1) is used to store the data D (n+2). The access count value portion CP(n+2) is used to store the access count value CV(n+2).

The control circuit 120 receives the interrupt command CMDITR when the refresh operation performing on the memory row MR(n). The refresh operation is interrupted. Thus, after the interrupt is lifted, the control circuit 120 recharges the same data D(n) in the data portion DP(n). Besides, the control circuit 120 resets the access count value CV(n) to the initial value and write the access count value CV(n) having the initial value into the access count value portion CP(n).

Then the control circuit 120 recharges the memory row MR (n+1). In other words, the data D(n+1) is refreshed. Besides, the control circuit 120 recharges the access count value CV(n+1) in the access count value portion CP(n+1). For example, the access count value CV(n+1) is "x", the control circuit 120 recharges the access count value CV(n+1) as "x" again. Then the control circuit 120 recharges memory row MR (n+2). In other words, the data D(n+2) is refreshed. Besides, the control circuit 120 recharges the access count value CV(n+2) in the access count value portion CP(n+2). For example, the access count value CV(n+2) is "y", the control circuit 120 recharges the access count value CV(n+2) as "y" again.

It should be noted, after the interrupt is lifted, the data D(n+1) stored in the memory row MR(n+1) and the data D(n+2) stored in the memory row MR(n+2) have been refreshed. Therefore, when the memory row MR(n) is frequently accessed, the recharged the data D(n+1) stored in the data portion DP (n+1) and the data D(n+2) stored in the data portion DP(n+2) could not be vulnerable and easily damaged by the row hammer.

Figure 5:
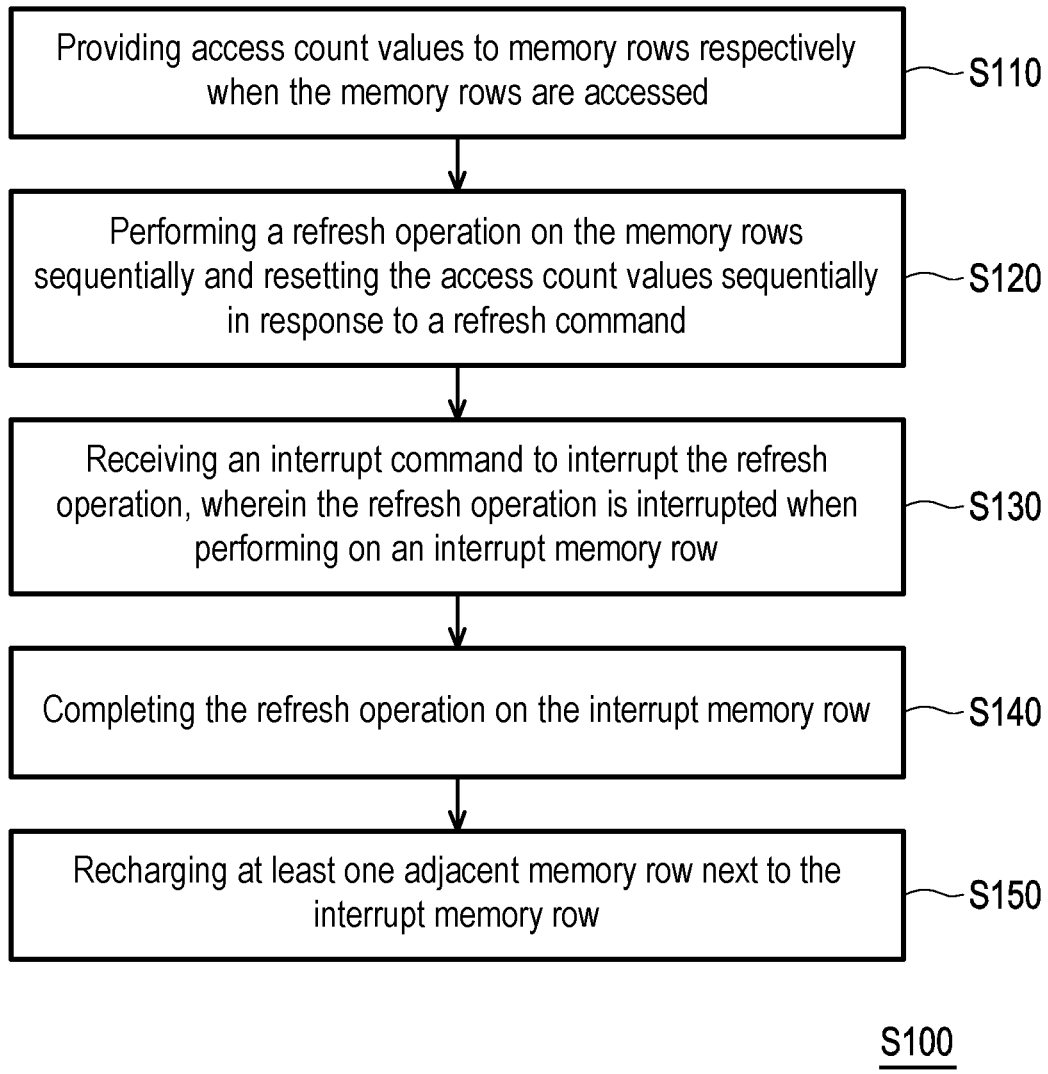
FIG. 5 illustrates a flow chart of a control method according an embodiment of the disclosure.

FIG. 5 illustrates a flow chart of a control method according an embodiment of the disclosure. Please refer to FIG. 2 and FIG. 5, in the embodiment, the control method S100 includes steps S110 to S150. In the step S110, the control circuit 120 provides the access count values CV(1) to CV(m) to the memory rows MR(1) to MR(m) respectively when the memory rows MR (1) to MR (m) are accessed. In the step S120, the control circuit 120 performs the refresh operation on the memory rows MR(1) to MR (m) sequentially and resets the access count values CV(1) to CV(m) sequentially in response to the refresh command CMDREF. In the step S130, the control circuit 120 receives the interrupt command CMDITR to interrupts the refresh operation. The interrupt memory row MRT is determined. After the interrupt is lifted, the control circuit 120 completes the refresh operation on interrupt memory row MRT in the step S140. In the step S150, the control circuit 120 recharges at least one adjacent memory row next to the interrupt memory row MRT. Detailly operations of the steps S110 to S150 have been clearly explained in the embodiments of FIG. 2, so it will not be repeated here.

Figure 6:
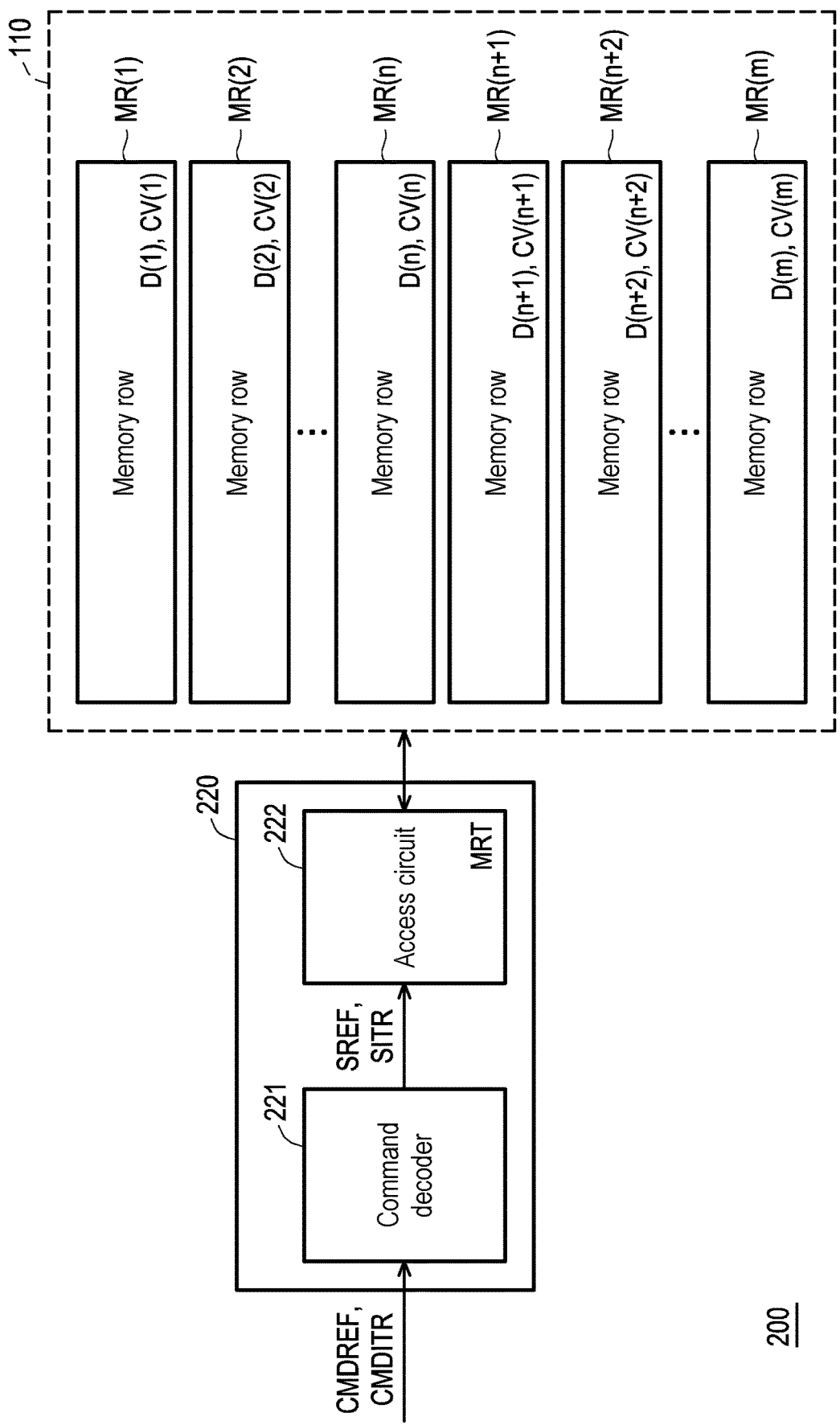
FIG. 6 illustrates a schematic diagram of a memory device according to an embodiment of the disclosure.

FIG. 6 illustrates a schematic diagram of a memory device according to an embodiment of the disclosure. Please refer to FIG. 6, in the embodiment, the memory device 200 includes the memory array 110 and a control circuit 220. the memory array 110 has been clearly explained in the embodiments of FIG. 2, so it will not be repeated here.

In the embodiment, the control circuit 220 includes a command decoder 221 and an access circuit 222. The command decoder 221 generates a refresh signal SREF when receiving the refresh command CMDREF and generates an interrupt signal SITR when receiving the interrupt command CMDITR. The command decoder 221 may decode the refresh command CMDREF to generate the refresh signal SREF and decode the interrupt command CMDITR to generate the interrupt signal SITR.

In the embodiment, the access circuit 222 is coupled to the memory array 110 and the command decoder 221. The access circuit 222 performs the refresh operation on the memory rows MR(1) to MR m) sequentially and resetting the access count values CV(1) to CV(m) sequentially in response to the refresh signal SREF. The access circuit 222 interrupts the refresh operation in response to the interrupt signal SITR. The access circuit 222 completes the refresh operation on the interrupt memory row MRT, and recharges at least one adjacent memory row next to the interrupt memory row MRT.

Besides, the access circuit 222 further performs the access operation on the memory array 110 and performs the mitigation operation on memory rows MR(1) to MR(m) to prevent row-hammer event.

In view of the foregoing, when the refresh operation is interrupted, the control circuit determines the interrupt memory row. The control circuit recharge the at least one adjacent memory row next to the interrupt memory row. Therefore, when the interrupt memory row is frequently accessed, the at least one adjacent memory row next to the interrupt memory row could not be damaged by the row hammer.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control method for performing row hammer protection of a memory device, wherein the memory device comprises a plurality of memory rows, wherein the control method comprises:

providing a plurality of access count values to the plurality of memory rows respectively when the plurality of memory rows are accessed;

performing a refresh operation on the plurality of memory rows sequentially and resetting the plurality of access count values sequentially in response to a refresh command;

receiving an interrupt command to interrupt the refresh operation, wherein the refresh operation is interrupted when performing on an interrupt memory row, and determining the interrupt memory row;

after the interrupt is lifted, completing the refresh operation on the interrupt memory row and resetting an access count value of the interrupt memory row to an initial value; and recharging at least one adjacent memory row next to the interrupt memory row, and rewriting at least one access count value of the at least one adjacent memory row next to the interrupt memory row.

2. The control method of claim 1, wherein recharging the at least one adjacent memory row next to the interrupt memory row comprises:

recharging two adjacent memory rows next to the interrupt memory row.

3. The control method of claim 1, wherein each of the plurality of memory row comprises:

a data portion, configured to store data; and an access count value portion, configured to store the access count value.

4. The control method of claim 3, wherein performing the refresh operation on the plurality of memory rows sequentially and resetting the plurality of access count values sequentially in response to a refresh command comprises:

recharging the data in the data portions of the plurality of memory rows sequentially; and resetting the plurality of access count values in the access count value portions of the plurality of memory rows sequentially.

5. The control method of claim 4, wherein recharging the at least one adjacent memory row next to the interrupt memory row comprises:

recharging the data in the data portion of the at least one adjacent memory row and rewriting the access count value in the access count value portion of the at least one adjacent memory row.

6. A memory device, comprising:

a memory array, comprising a plurality of memory rows; and a control circuit, coupled to the memory array, and configured to:

provide a plurality of access count values to the plurality of memory rows respectively when the plurality of memory rows are accessed;

perform a refresh operation on the plurality of memory rows sequentially and resets the plurality of access count values sequentially in response to a refresh command;

receive an interrupt command to interrupt the refresh operation, wherein the refresh operation is interrupted when performing on an interrupt memory row, and determining the interrupt memory row;

after the interrupt is lifted, complete the refresh operation on the interrupt memory row and reset an access count value of the interrupt memory row to an initial value; and recharge at least one adjacent memory row next to the interrupt memory row, and rewrite at least one access count value of the at least one adjacent memory row next to the interrupt memory row.

7. The control circuit of claim 6, wherein the control circuit comprising:

a command decoder, configured to generate a refresh signal when receiving the refresh command and generate an interrupt signal when receiving the interrupt command; and an access circuit, coupled to the memory array and the command decoder, and configured to:

perform the refresh operation on the plurality of memory rows sequentially and resetting the access count values sequentially in response to the refresh signal;

interrupt the refresh operation in response to the interrupt signal, complete the refresh operation on the interrupt memory row and recharge at least one adjacent memory row next to the interrupt memory row.

8. The memory device of claim 6, wherein the control circuit recharges two adjacent memory rows next to the interrupt memory row.

9. The memory device of claim 6, wherein each of the plurality of memory row comprises:

a data portion, configured to store data; and an access count value portion, configured to store the access count value.

10. The memory device of claim 9, wherein the control circuit recharges the data in the data portions of the plurality of memory rows sequentially, and resets the plurality of access count values in the access count value portions of the plurality of memory rows sequentially.

11. The memory device of claim 10, wherein after the interrupt is lifted, the control circuit recharges the data in the data portion of the at least one adjacent memory row and rewrites the access count value in the access count value portion of the at least one adjacent memory row.

* * * * *